July 2, 1968          M. G. BODMER ET AL          3,391,299
                HIGH STABILITY TRAVELING WAVE TUBE
Filed March 1, 1965                             2 Sheets-Sheet 1
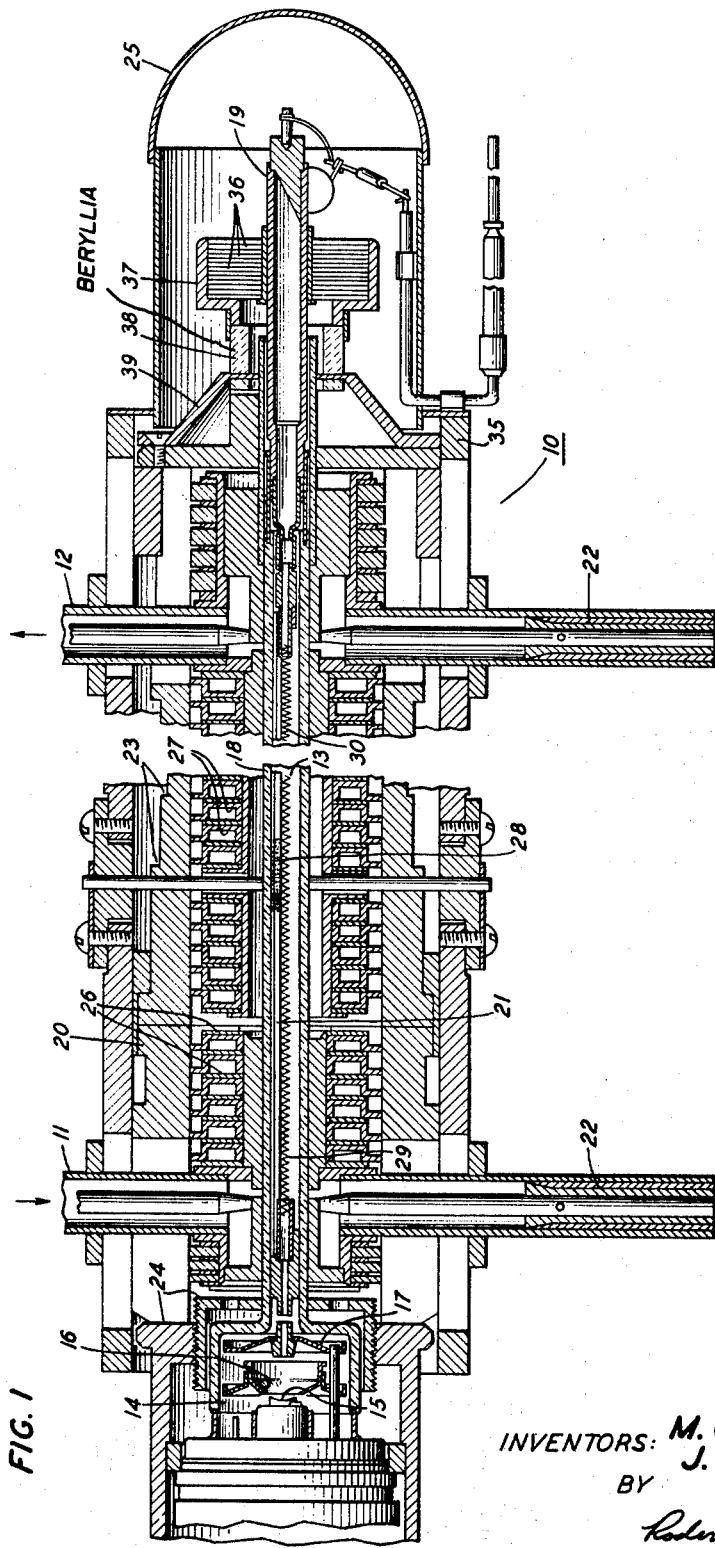
INVENTORS: M. G. BODMER
           J. W. WEST
BY
*Roderick B. Anderson*
ATTORNEY

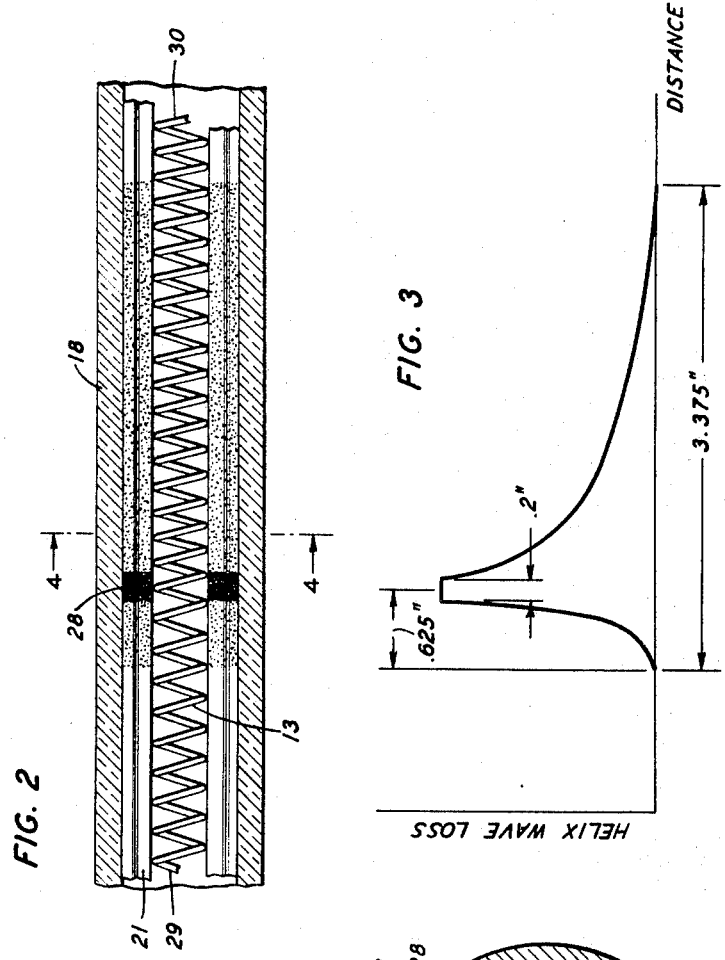
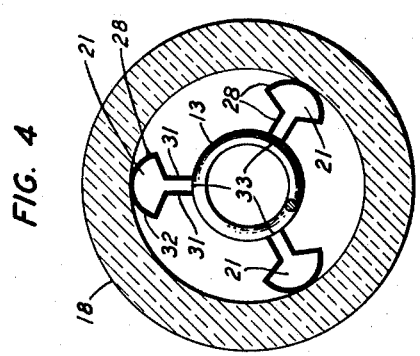

**3,391,299
HIGH STABILITY TRAVELING
WAVE TUBE**
Max G. Bodmer, Short Hills, and John W. West, Millington, N.J., assignors to Bell Telephone Laboratories, Incorporated, New York, N.Y., a corporation of New York
Filed Mar. 1, 1965, Ser. No. 436,001
14 Claims. (Cl. 315—3.6)

ABSTRACT OF THE DISCLOSURE

A traveling wave tube is described having high stability and efficiency. Stability is provided by dissipating reflected electromagnetic wave energy in a suitably located and distributed loss material; and interaction efficiency is enhanced by constructing the conductive helix of the tube so that it has an input section of one continuous pitch and an output section of a slightly lower continuous pitch. By locating the loss material so that maximum reflected wave dissipation occurs at the change in the pitch of the helix, deleterious side effects of the pitch change are minimized; and variations in loss characteristics with extent of use are reduced by shielding the loss material from ions generated by the electron beam in the traveling wave tube. Axial movement of the collector of the tube because of thermal expansion and contraction is absorbed by mounting the collector within a large number of thermally conductive, flexible annular disks. And the collector is cooled by thermally connecting it through the annular disks and a portion of beryllia, which is a good thermal conductor but is also an electrical insulator, to the tube package, which acts as a heat sink.

---

This invention relates to electron discharge devices, and more particularly, to traveling wave tubes.

The traveling wave tube is a device for amplifying high frequency signal waves by transmitting the waves in close proximity to an electron beam. A conductive helix a plurality of operating wavelengths long surrounds the electron beam and transmits wave energy at a net axial phase velocity which is in approximate synchronism with the electron beam velocity. By a coupling phenomenon known as cumulative interaction, the traveling electromagnetic wave abstracts energy from the beam and thereby becomes amplified; the amplified wave energy is then transmitted from the output end of the helix to an appropriate load.

It is an object of this invention to provide traveling wave tubes of high efficiency and stability.

The major cause of instability in a traveling wave tube is the tendency of wave energy to be reflected from the output end of the helix and thereby establish spurious oscillations in the tube. To combat this problem it is common practice to spray part of the helix with a loss material which absorbs and dissipates the reflected electromagnetic wave energy. The input signal energy is maintained through the loss section because at that location much of the input signal wave energy exists on the beam as space-charge waves and can therefore propagate fairly freely. These space-charge waves result from velocity modulations of the electrons by the input electromagnetic wave.

In a high efficiency tube it is important to locate the loss section far enough away from the output end of the helix so that unimpeded interaction can take place along a fairly long distance between the loss section and the output; it can be shown that gain is an exponential function of distance. On the other hand, the loss section should be far enough from the input end of the helix to permit the formation of well defined space-charge waves on the beam. For high efficiency operation, the loss should ordinarily be located about one-third the distance from the input end of the helix.

In spite of the loss material that is used, it is generally recognized that a high efficiency tube requires some compromise between high gain and tube stability. If the tube is operated with appropriate synchronization between the velocities of the beam and the helix wave for maximum gain, the tube is susceptible to spurious oscillation because inevitably spurious energy is greatly amplified along with the signal wave. The typical high efficiency tube is therefore operated with a helix voltage that gives less than maximum gain. As will be explained later, these tubes are voltage sensitive, that is, accidental changes in helix voltage may cause oscillation or may seriously reduce tube efficiency.

In accordance with one feature of the invention, the helix is constructed with an input section of one continuous pitch and an output section of a slightly lower continuous pitch. Under conditions of normal operating voltage, the wave on the input section is in synchronism with the beam for maximum gain, while the output section transmits the wave at a lower velocity and gives lower gain per unit of length. As will be explained later, these two sections complement each other to stabilize tube operation and to make it less sensitive to helix voltage changes. For example, if the helix voltage is accidently reduced, the following conditions result: the beam velocity is reduced because it is a function of helix voltage; the gain in the input section is reduced because the beam falls slightly out of the normal synchronism which is required for maximum gain; the gain in the output section is increased because the beam velocity approaches the helix wave velocity in that region; the reduced gain in the input section compensates to some extent for the increased gain in the output section and thereby prevents the tube from oscillating. Our dual-pitch helix therefore makes the tube less sensitive to voltage changes.

The helix pitch change is advantageously located at the same position as the maximum helix wave loss. The effects of the helix discontinuity resulting from the change in pitch is therefore minimized because nearly all wave energy on the helix is absorbed before it reaches the discontinuity. It can be shown that in a high efficiency tube the optimum positions for the helix loss and the helix pitch transition approximately correspond.

In a high efficiency tube it is important that the helix loss be very carefully applied so that it effectively acts as a reflectionless absorber of waves traveling toward the input end, while minimally affecting the growing wave on the helix traveling toward the output end. As is known, the density of the loss material should be tapered in the direction of the output end so that reflected backward traveling waves are gradually absorbed. On the other hand, the total length of the loss section should be minimized to give the smallest possible interference with the growing wave on the helix. It has been found, however, that after conventional tubes have been operated over a period of time, the loss characteristics tend to change and to become less effective for absorbing spurious energy.

It has been determined that this apparent instability of the loss results from electron and ion bombardment of the loss material which causes it to deteriorate. Accordingly, it is another feature of this invention that the loss material be shielded from the electron stream; this also shields the material from ions which are generated by the electron beam. Shielding is achieved by restricting the loss material to the longitudinally extending support rods which abut against and support the helix. The support rods have substantially parallel side walls that extend from the helix toward the envelope. These side walls are coated with the loss material and, because they do not face the beam, are not subjected to electron and ion bombardment.

Loss material which is restricted solely to the helix support rods is effective for absorbing wave energy because the fields which define the waves must necessarily extend through the support rods. When these fields are damped out, the propagating wave is dissipated even though the loss material does not contact the helical conductor. The helix and the portion of the support rods which face the beam are masked during the application of the loss material as will be explained hereafter. Therefore, after loss material has been applied such as to achieve a desirable loss characteristic along the helix, the tube may be operated without this characteristic being affected.

Another factor which affects tube efficiency is the collector temperature. Generally, the collector of a high efficiency tube must be cooled so that its electrical characteristics are maintained within tolerable limits. In some situations it is inconvenient to cool the collector by transmitting air, water, or other fluid past it. Radiation fins may also be ineffective for keeping the collector at a relatively low temperature, particularly if the collector is enclosed. In accordance with our invention, the collector is thermally connected to the tube package which acts as a heat sink. This connection is made through a portion of beryllia which is a good thermal conductor but is also an electrical insulator. It therefore permits the collector to be maintained at a much higher voltage than the tube package.

Considerable axial movement of the collector may take place because of thermal expansion and contraction. In accordance with another feature of the invention, heat is transmitted from the collector by a large number of flexible metal annular disks which are bonded at their inner peripheries to the collector. The outer peripheries of the disks are bonded to a metal cylinder portion which is in turn rigidly bonded to the beryllia portion. Hence, when the collector moves as a result of thermal stresses, the thin metal disks flex without exceeding their elastic limits and prevent breaking due to metal fatigue or other disruptions of the thermal path for transmitting heat from the collector, as would be the case if a single heavy annular disk were used. The collector is permitted to move freely in the axial direction, but maintains accurate alignment with the focusing circuit.

These and other objects and features of the invention will be better appreciated from a consideration of the following detailed description, taken in conjunction with the accompanying drawing in which:

FIG. 1 is a sectional view of a traveling wave tube employing the principles of the invention;

FIG. 2 is an enlarged view of part of the helix and helix support structure of the traveling wave tube of FIG. 1;

FIG. 3 is a graph of loss density on the helix support structure of FIG. 2; and

FIG. 4 is a section taken along lines 4—4 of FIG. 2.

Referring now to FIG. 1 there is shown a traveling wave tube package 10, the purpose of which is to amplify electromagnetic waves which are transmitted by an input coaxial cable 11 in the direction shown by the arrow. Located near the opposite end of the device is an output coaxial cable 12 for abstracting amplified electromagnetic waves from the traveling wave tube and transmitting them to an appropriate load as indicated by the arrow. Extending between the input and output coaxial cables is a conductive wire helix 13 which surrounds the central axis of the device. An electron beam is formed and projected along the central axis by an electron gun 14. The electron gun is of a well-known type which includes a cathode 15, a beam forming electrode 16 and an accelerating anode 17. The beam is maintained within a vacuum by an evacuated glass envelope 18 which surrounds the helix and the electron gun. The electron beam is collected by a collector electrode 19 located at the end of the envelope opposite the electron gun. A permanent magnet 20 surrounding the envelope focuses the beam and constrains it to flow along the central axis to the collector. The helix is mounted in the envelope by three support rods 21 which are shown in more detail in FIGS. 2 and 4.

Electromagnetic wave energy from the input coaxial line 11 is coupled in a known manner to the helix 13 and is thereby transmitted toward the output line 12. In accordance with known principles of traveling wave tube operation, the beam velocity and the helix pitch are appropriately inter-related so that the wave on the helix travels in approximate synchronism with the beam. Axial fields associated with the wave velocity modulate the component electrons of the beam to form space-charge waves which are coupled with the helix as they flow toward the collector. These space-charge waves abstract drift velocity energy from the beam so that the wave energy appearing at the output end of the helix is an amplified form of that which was introduced at the input end. Coupling from the output end of the helix to output coaxial line 12 takes place in substantially the same manner as the input coupling. The coaxial lines include movable terminations 22 of the type described in the U.S. patent of Laico, 3,123,430, assigned to Bell Telephone Laboratories, Incorporated, for appropriate impedance matching of the cables with the helix.

In order to reduce the weight of the over-all package, part of the permanent magnet 20 has been cut away along the middle region thereof which results in a series of steps 23. It has been found that a substantial portion of the generally cylindrical permanent magnet can be removed in this manner without affecting beam focusing or substantially increasing electron impingment on the helix. The resultant reduction of weight of the package can be very important if the tube is to be used as an amplifier in a communications satellite.

In accordance with a well-known method of electron beam formation known as Brillouin flow, the electron gun 14 is magnetically shielded by ferromagnetic elements 24 so that substantially no magnetic field extends through the cathode. In the absence of any modification, this shielding results in an asymmetrical flux distribution which would magnetically unbalance the tube package 10. This would establish a magnetic moment resulting in a net torque which could be troublesome if the tube package were used in a communications satellite. A more symmetrical flux distribution is attained by including at the collector end an enclosure 25 made of a magnetic material for guiding the magnetic flux, shielding the collector, and compensating for the magnetic shielding at the electron gun end of the package.

Surrounding a major portion of the tube envelope are a plurality of annular ferromagnetic disks 26 which are known in the art as "field straighteners." Their purpose is to aid in the establishment of a substantially uniform longitudinal magnetic field along the central axis as is required for good beam focusing. The disks 26 are maintained at predetermined spaced locations by intervening spacers 27 which may be of aluminum or other nonferrous material. It has been found that by making the outer diameter of the disks 26 smaller than the inner diameter of the permanent magnet 20, the effects of unavoidable magnetic field irregularities due to inhomogeneities in the magnets can be reduced. The small magnetic field transitions resulting from these irregularities are tapered more gradually than would be the case if the disks 26 abutted directly against the inner surface of the permanent magnet.

The illustrative tube of FIG. 1 is designed for high efficiency operation. Appropriate direct-current voltage sources may bias the helix at 1770 volts, the collector at 1000 volts, the accelerating anode 17 at 2000 volts, and the cathode 15 at zero volts. A conventional heater is located within the cathode assembly. The helix 13 is six inches long. Other pertinent parameters are designed to give at the high efficiency operating voltage a maximum gain of 42 db within an operating frequency of 3.9 to 4.3 kilomegacycles per second.

As mentioned above, the major cause of instability in a traveling wave tube is the tendency of wave energy to be reflected from the output end of the helix back toward the input end and thereby cause spurious oscillations within the device. In accordance with our invention, the support rods 21 are coated along a discrete region with a layer 28 of electromagnetic wave absorbing material such as Aquadag. Normally, this loss material is coated on both the helix and support rods, but for reasons to be explained later, is preferably restricted to selected portions of the support rods 21 as shown in FIGS. 2 and 4. As spurious electromagnetic wave energy travels from the output end of the helix toward the input end, it encounters the loss region defined by the loss material 28. The fields accompanying this wave energy extend into the support rods 21 and are absorbed by the loss coating 28. Such absorption effectively dissipates the wave on the helix even though the loss material does not actually contact the helix. The loss region divides the helix between an input section 29 and an output section 30.

For high efficiency operation, the loss material should be located fairly close to the input end of the helix so that unimpaired interaction can take place over an extended length between the loss section and the output end of the helix. Since gain resulting from cumulative interaction is an exponential function of distance, it is advisable that the interruption of the gain mechanism caused by the loss section be located a fairly large distance from the output end. On the other hand, input energy propagates through the loss section primarily in the form of beam space-charge waves. The loss section should therefore be located far enough away from the input end to permit the establishment of well defined space-charge waves which are capable of propagating through the loss section. The loss material 28 is located to have a maximum density approximately one-third of the distance from the input end to the output end of the helix which represents an optimum compromise of the considerations described for the tube package 10 having the operating characteristics mentioned above.

It is important that the backward traveling waves be gradually absorbed by the loss material 28 rather than being reflected by it. Therefore, as shown by the graph of FIG. 3, the loss tapers for a substantial distance toward the output end of the helix although the maximum loss is concentrated along a distance of only about .2 inch. The total helix length is about six inches. The loss also tapers somewhat toward the input end of the helix but to a smaller extent. Reflections toward the input end are less critical because spurious energy reflected in that direction will not be amplified to as great an extent and are therefore less likely to cause troublesome oscillations. As shown in the drawing, the total length of the loss region in our illustrative embodiment is 3.375 inches, while the distance from the input end of the loss to the point of maximum loss is .625 inch. As will be explained later, it is important that the loss material 28 be very carefully applied in any well-designed high efficiency tube to give an optimum loss characteristic such as that shown.

In accordance with another feature of the invention, the helix pitch in the output section 30 is lower than that in the input section 29. The gain of a traveling wave tube depends in large part on the degree of synchronization of the beam velocity with the axial helix wave velocity. The beam velocity is a function of direct-current helix voltage, while the helix wave velocity is a function of helix pitch. In high efficiency tubes it is common practice to bias the helix at an over-voltage, that is, a D-C voltage that is higher than that required for maximum gain. This reduces the gain of spurious energy and stabilizes tube operation. However, such tubes may be quite voltage sensitive in that reductions of helix voltage may cause tube oscillation while increases in helix voltage may markedly reduce the calculated tube gain.

With the dual-pitch helix, gain is maximized in the input section, while the output section is effectively biased at an over-voltage because the smaller pitch in that region reduces the helix wave velocity with respect to the beam velocity. Under normal conditions, tube instabilities are avoided while giving maximum gain over at least part of the helix length. If the helix voltage is accidentally changed slightly, the gain will not be drastically affected because the input section is normally operated at an optimum voltage for high gain and is therefore not so sensitive to voltage changes. Reductions in helix voltage are less likely to result in tube oscillation because they reduce the gain of the input section while they increase the gain of the output section. The comparative voltage insensitivity of our device is particularly useful for tubes operated in an isolated environment, such as a communications satellite, where readjustments of voltage cannot be easily made.

In the illustrative tube described, the input section 29 of the helix has forty-seven turns per inch, while the output section 30 has forty-nine turns per inch, with a constant helix operating voltage of 1770 volts. The transition between the two sections is made quite abruptly essentially at the middle of the region of maximum loss material density. It has been found that this method of inducing variable gain along the helix is preferable to the use of a helix of gradually changing pitch because each pitch change constitutes a transmission line discontinuity which can reflect wave energy and thereby cause instabilities.

As can be appreciated from FIGS. 2 and 3, the change of pitch in our helix occurs at the point of highest wave loss on the helix. At that point substantially no wave energy can propagate on the helix and therefore energy cannot be reflected from the helix discontinuity resulting from the change of pitch. It can be shown that the optimum locations for the wave loss, and the helix pitch change, approximately correspond, and so it is practical and convenient to "bury" the helix pitch discontinuity in the maximum helix wave loss region.

In a high efficiency traveling wave tube it is particularly important that the helix wave loss characteristic shown in FIG. 3 be maintained throughout the operating life of the tube. This is because the loss material is very carefully applied during the manufacture to minimize interference with propagating space-charge waves while effectively absorbing electromagnetic waves on the helix. It has been found that in conventional tubes where both the helix and support rods are completely covered over a discrete length with loss material of varying density, the loss characteristic tends to change during extended tube operation. It has further been found that this change results from electron and ion bombardment of the loss material which in time reduces the wave loss and tends to make the tube unstable.

For these reasons, the helix loss material 28 of the present invention has been restricted to the helix support rods 21. Further, the support rods are made in the configuration shown in FIG. 4 to define parallel side walls 31 which do not face the beam and are therefore effectively shielded from the beam. A cylindrical wall portion 32 of the support rods aids in accurately fitting the helix structure within the tube envelope 18. The rods 21 may be conveniently made from conventional cylindrical stock which is cut away to form the planar side walls 31.

The inner and outer peripheries of the helix 13 are preferably masked during the application of the loss material 28. This masking operation also prevents the application of loss to the inner walls 33 of the support rods which are bonded to the helix. The loss is applied to the support rods in a conventional manner such as spraying.

With the loss so applied, the only loss material on the support rod which faces the electron beam is sufficiently far removed from it to be immune to damaging electron and ion bombardment. The planar walls 31 do not face the beam and are therefore effectively shielded from such bombardment. With the helix wave loss located in this manner, the loss characteristic such as that shown in FIG. 3 remains substantially constant throughout the operating life of the tube.

High efficiency operation requires an appropriately high current density electron beam. The collector 19 must be cooled to avoid structural damage and substantial changes of electrical characteristics from the heat which accompanies electron beam collection. Water cooling or forced air convection cooling is relatively complicated and is impractical when the tube package is being used in a communications satellite. The cooling problems are further complicated by the enclosure 25 which tends to retain heat that is radiated by the collector. In accordance with our invention, the collector is thermally connected to a cylindrical cover 35 which surrounds the magnet so that the mass of the tube package acts as a heat sink. The collector is connected to the cover 35 through a large number of thin flexible annular metal disks 36, a metal cylinder portion 37, a cylindrical beryllia portion 38, and a metal thermal conductor 39. The beryllia cylinder 38 electrically insulates the collector from the rest of the package so that the collector can be maintained at a high voltage as mentioned previously. Beryllia does, however, act as a good thermal conductor.

Intermittent operation of the traveling wave tube imposes thermal stresses on the collector which force it on occasion to make relatively substantial axial movements. These stresses are absorbed by the annular disks 36 which flex perceptibly when the collector 19 makes axial movements. In order to give the required flexibility, the disks should be fairly thin and have a sufficiently large outer diameter. On the other hand, efficient thermal transmission would generally require disks of small outer diameter to minimize the thermal path length, and disks of sufficient thickness to provide maximum thermal conductivity. These contrary requirements are satisfied by using a large multiplicity of thin disks; all of the disks in the aggregate give a thermal path of high conductivity.

It is important that each disk be of appropriate dimensions such that its flexing does not cause the disk to exceed its elastic limit which would cause "work hardening" of the material. Work hardening would cause extreme stiffening of the disks and could result in breaking of the glass envelope because the collector would not be free to move axially with thermal expansions and contractions. Alternatively, the disks themselves would break due to fatigue if not kept within their elastic limit. Given these considerations, known design techniques can be employed for ascertaining the appropriate dimensions for any particular tube. In our illustrative embodiment, 11 disks are used which are made of copper, have an inner diameter of 3/8 inch, an outer diameter of 1 inch and a thickness of 3 mils. It can be seen that through the use of this particular feature, good thermal conduction from the collector is maintained while allowing the collector to move axially in response to thermal stresses without overstressing the glass or causing fatigue of the disks.

It can be appreciated from the foregoing that the features described can be used in any of various combinations depending upon the results desired. Numerous other embodiments and modifications may be made by those skilled in the art without departing from the spirit and scope of the invention.

What is claimed is:
1. In combination:
an electron gun for forming and projecting a beam of electrons;
means comprising a magnet for constraining the beam to flow along a central axis;
a collector for collecting the beam;
a continuous wire helix surrounding a major portion of the central axis for providing a slow wave path for electromagnetic waves from an input end thereof to an output end in interacting relationship with the beam;
said helix having a first continuous pitch near the input end and a second continuous pitch near the output end which is smaller than the first pitch;
means located in proximity to a discrete portion of the helix for absorbing electromagnetic wave energy from said discrete portion of the helix;
said discrete portion of the helix including the transition from the first helix pitch to the second helix pitch;
a metal cover surrounding the magnet;
a substantially rigid metal cylindrical portion surrounding the collector and connected through a thermal conductor to the cover;
a plurality of annular metal disks bonded at their outer peripheries to the cylindrical portion and at their inner peripheries to the collector;
the metal disks being sufficiently thin and flexible to flex without substantially interfering with axial movements of the collector due to thermal stresses.

2. The combination of claim 1 wherein:
the collector is maintained at an electrical voltage which is different from that of the metal cover;
and the thermal conductor is made of a material which is a good electrical insulator.

3. The combination of claim 2 further comprising:
means for reducing the magnetic moment generated by the magnet comprising an enclosure made of magnetic material which surrounds and encloses the collector.

4. The combination of claim 1 wherein:
the frequency of the electromagnetic wave energy is in the range of 3.9 to 4.3 kilomegacycles per second;
the first pitch defines substantially 47 turns per inch of the helix;
the second pitch defines substantially 49 turns per inch of the helix;
and the pitch transition is located approximately one-third of the distance from the input end of the helix to the output end.

5. The combination of claim 1 further comprising:
an evacuated envelope surrounding the helix;
a plurality of helix support rods extending along the helix and abutting against the envelope;
said support rods having side walls defined substantially by parallel planes;
and wherein the means for absorbing electromagnetic wave energy consists solely of loss material which is bonded to the helix support rods, whereby substantially none of the loss material is exposed to electron and ion bombardment from the electron beam.

6. An electron discharge device comprising:
means for forming and projecting a stream of electrons;
means for producing interaction between the stream of electrons and electromagnetic wave energy;
a substantially cylindrical collector for collecting the electrons;
said collector being susceptible to axial movements resulting from thermal stresses;
a relatively rigid and massive heat sink made of thermally conductive material;
a relatively rigid cylindrical member thermally connected to the heat sink and surrounding the collector;
and a plurality of annular metal disks bonded at their outer peripheries to the cylindrical member and at their inner peripheries to the collector;

the annular disks being sufficiently thin and flexible to flex without breaking in response to the axial movements of the collector.

7. The electron discharge device of claim 6 further comprising:
means for biasing the collector at a different voltage from that of the heat sink;
and wherein the cylindrical member is thermally connected to the heat sink through an intermediate member made of beryllia.

8. A traveling wave tube comprising:
means for forming and projecting a beam of electrons;
a collector for collecting the beam;
a conductive helix surrounding the beam path;
a magnet surrounding the helix;
means for coupling electromagnetic wave energy to an input end of the helix;
means for abstracting wave energy from an output end of the helix;
an input section of the helix comprising approximately one-third of the helix length nearest the input end having a first substantially continuous pitch;
the remainder of the helix having a second substantially continuous pitch which is lower than the first pitch;
the helix portion which includes the junction of the input section with the remainder of the helix defining a helix loss region;
means for attenuating microwave propagation on the helix in the helix loss region;
a metal cover surrounding the magnet and electrically insulated from the collector;
a rigid metal cylinder portion surrounding the collector and in thermal connection with the cover;
and a plurality of flexible annular thermal conductors bonded at their outer peripheries to the cylinder portion and at their inner peripheries to the collector.

9. A traveling wave tube comprising:
means for forming and projecting a beam of electrons;
a collector for collecting the beam;
a single conductive helix surrounding a major portion of the beam path;
an envelope surrounding the helix;
a magnet surrounding the envelope;
means for coupling electromagnetic wave energy to an input end of the helix;
means for extracting wave energy from an output end of the helix;
means for biasing the entire helix at a predetermined direct current voltage;
means for substantially prohibiting electromagnetic wave propagation along a discrete loss section of the helix;
the helix having a first continuous pitch between the input end thereof and the loss section and a second continuous pitch which is smaller than the first pitch between the loss section and the output end thereof;
the bias means comprises means for maintaining the velocity of the electron beam in substantial synchronism with the axial phase velocity of the electromagnetic wave energy between the input end and the loss section of the helix and slightly higher than said phase velocity between the loss section and the output end of the helix.

10. A traveling wave tube comprising:
means for forming and projecting a beam of electrons;
a collector for collecting the beam;
a single conductive helix surrounding a major portion of the beam path;
an envelope surrounding the helix;
a magnet surrounding the envelope;
means for coupling electromagnetic wave energy to an input end of the helix;
means for extracting wave energy from an output end of the helix;
means for biasing the entire helix at a predetermined direct current voltage;
means for substantially prohibiting electromagnetic wave propagation along a discrete loss section of the helix;
the helix having a first continuous pitch between the input end thereof and the loss section and a second continuous pitch which is smaller than the first pitch between the loss section and the output end thereof;
a plurality of helix support rods each substantially coextensive with the helix and abutting against the helix and the envelope;
said support rods having parallel side walls which do not face the electron beam and an interconnecting wall which does face the beam;
and wherein the means for absorbing electromagnetic wave energy consists solely of loss material which is bonded to the helix support rod but which is not bonded to the interconnecting wall, whereby substantially all of the loss material is shielded from the electron beam.

11. A traveling wave tube comprising:
means for forming and projecting a beam of electrons;
a collector for collecting the beam;
a single conductive helix surrounding a major portion of the beam path;
an envelope surrounding the helix;
a magnet surrounding the envelope;
means for coupling electromagnetic wave energy to an input end of the helix;
means for extracting wave energy from an output end of the helix;
means for biasing the entire helix at a predetermined direct current voltage;
means for substantially prohibiting electromagnetic wave propagation along a discrete loss section of the helix;
the helix having a first continuous pitch between the input end thereof and the loss section and a second continuous pitch which is smaller than the first pitch between the loss section and the output end thereof;
the frequency of the electromagnetic wave energy is in a range of 3.9 to 4.3 kilomegacycles per second;
the first pitch defines substantially 47 turns per inch of the helix;
the second pitch defines substantially 49 turns per inch of the helix;
and the discrete loss section is located approximately one-third of the distance from the input end of the helix to the output end.

12. A traveling wave tube comprising:
means for forming and projecting an electron beam within an elongated envelope;
means comprising a conductive helix extending within the envelope for propagating electromagnetic wave energy in coupling relationship with the beam;
means comprising a plurality of elongated support rods that are substantially coextensive with the helix for supporting the helix within the envelope;
said support rods comprising a first cylindrical wall portion abutting against the envelope, a second wall portion abutting against the helix, and third substantially planar side wall portions extending between the first and second wall portions;
means for attenuating electromagnetic wave energy propagating along a discrete section of the helix;
said attenuating means consisting solely of loss material which is bonded to the first and third wall portions of the support rods, whereby substantially all of the loss material is shielded from the beam.

13. A traveling wave tube comprising:
an electron gun including a cathode for forming and projecting a beam of electrons;
a collector for collecting the beam;

a single conductive helix surrounding a major portion of the beam path;
an envelope surrounding the helix;
a magnet surrounding the envelope;
a substantially cylindrical metal cover surrounding the magnet;
means for coupling electromagnetic wave energy in the kilomegacycle frequency range to an input end of the helix;
means for extracting wave energy from an output end of the helix;
a plurality of support rods each substantially coextensive with the helix and abutting against the helix and the envelope;
said support rods having substantially parallel side walls which do not face the beam;
means for attenuating electromagnetic waves propagating along a discrete section of the helix consisting solely of loss material which is bonded to the support rods and which is substantially shielded from the beam;
said helix having a first continuous pitch between the input end thereof and the discrete section and a second continuous pitch which is smaller than the first pitch between the discrete section and the output end thereof;
means for substantially shielding the cathode from magnetic flux generated by the magnet;
means comprising a ferromagnetic enclosure surrounding and enclosing the collector for reducing the magnetic moment resulting from the magnet and the cathode shielding means;
a substantially rigid metal cylindrical portion surrounding the collector and contained within the enclosure;
a plurality of relatively thin annular metal disks that are bonded at their outer peripheries to the metal cylinder portion and at their inner peripheries to the collector;
means for biasing the collector and the cylindrical cover at different voltages; and
means comprising a beryllia section for thermally connecting the metal cylinder portion with the cylindrical cover and for electrically insulating the collector from the cylindrical cover.

14. The traveling wave tube of claim 13 further comprising:
means for biasing the helix at a direct-current voltage which maintains the beam at a velocity which is substantially equal to the axial phase velocity of the electromagnetic wave energy on the helix portion of the first pitch and which is higher than the axial phase velocity of the electromagnetic wave energy on the helix portion of the second pitch.

References Cited

UNITED STATES PATENTS

| | | | |
|---|---|---|---|
| 2,575,383 | 11/1951 | Field | 315—3.6 |
| 2,584,597 | 2/1952 | Landauer | 315—3.6 X |
| 2,922,920 | 1/1960 | Convert | 315—3.6 |
| 3,050,657 | 8/1962 | Branch | 315—3.6 |
| 3,092,750 | 6/1963 | Haus et al. | 315—3.6 |
| 3,193,003 | 7/1965 | McCuen | 313—46 |

HERMAN KARL SAALBACH, *Primary Examiner.*

S. CHATMONT, JR., *Assistant Examiner.*